Sept. 26, 1933. A. O. ABBOTT, JR 1,927,821
MEASURING DEVICE
Filed Jan. 29, 1930  2 Sheets-Sheet 1
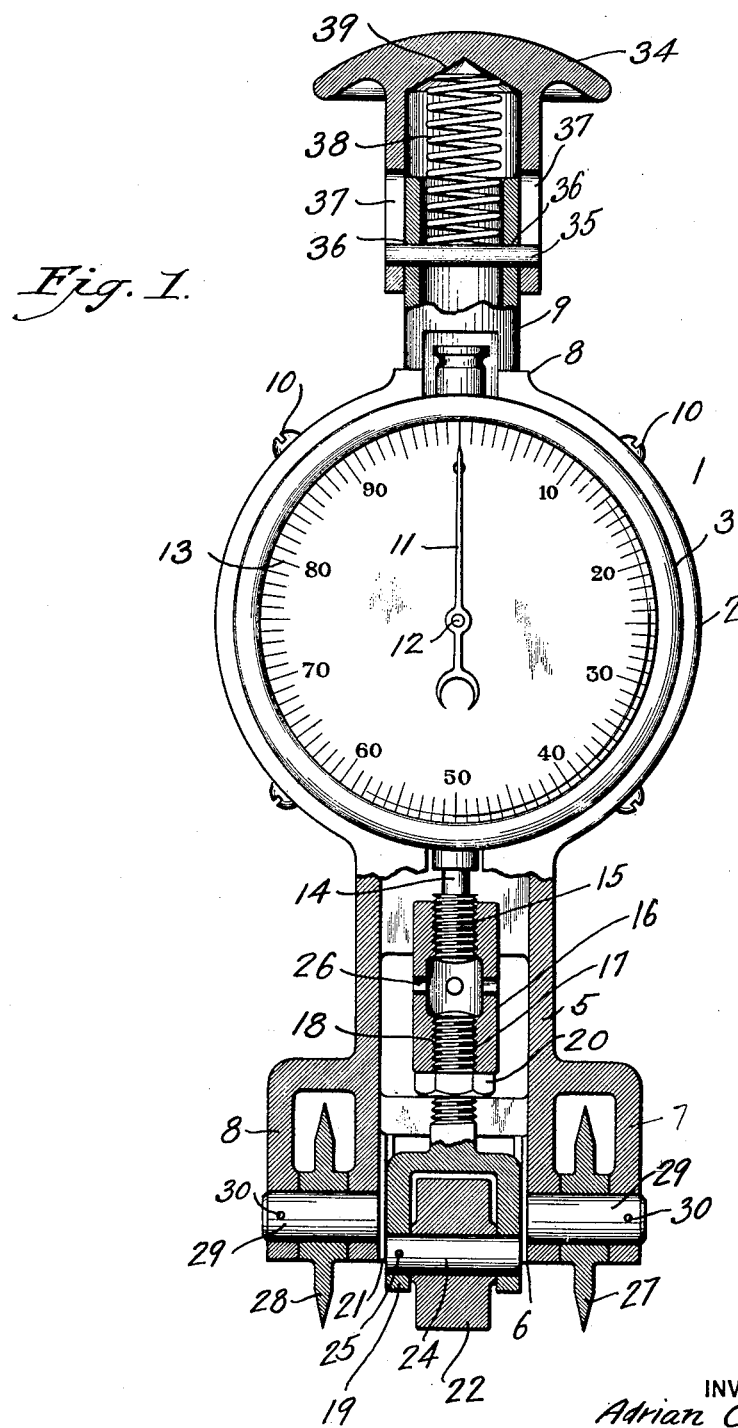
Fig. I.
INVENTOR
Adrian O. Abbott, Jr.
BY
ATTORNEY Sept. 26, 1933.  A. O. ABBOTT, JR  1,927,821
MEASURING DEVICE
Filed Jan. 29, 1930   2 Sheets-Sheet 2

INVENTOR
Adrian O. Abbott, Jr.
BY
ATTORNEY

Patented Sept. 26, 1933

1,927,821

UNITED STATES PATENT OFFICE 1,927,821

MEASURING DEVICE

Adrian O. Abbott, Jr., Detroit, Mich., assignor to Morgan & Wright, Detroit, Mich., a corporation of Michigan Application January 29, 1930. Serial No. 424,179

3 Claims. (Cl. 33—172)

My invention relates to measuring devices and more particularly to gauges for measuring thicknesses of plastic materials.

In many industries a base material is covered with a coating or surfacing layer of material of different characteristics. The base material may be in sheet form, tubular form, or other shapes. The thickness of the coating material is often of considerable importance. In some cases the customer requires the thickness of the coating material to be within definite limits. In other cases the value of the coating material is rather high in comparison with the cost of the base material and coatings of excessive depth are costly.

In coating bases with plastic materials, such as rubber, it is possible to penetrate the coating layer, but such layers are of relatively small thicknesses so that an accurate gauge is required to measure the thickness of the coating layer.

In the case of materials coated on rolls, cylinders, and the like, it has heretofore been common practice to measure the total radius of the cylinder or roll and the applied material, and then subtract the radius of the cylinder or roll to determine the thickness of the coating layer. This method is inaccurate since what is really being measured is the distance between the outer surface of the material and the center line of the roll.

Variations in the roll itself disturb the accuracy of the gauge readings and result in obtaining inaccurate measurements of stock thickness. As calender rolls are subject to elevated temperatures, it is extremely difficult to obtain uniformity of them due to the expansion and contraction of the rolls with changing temperatures.

I provide a gauge for measuring thicknesses of materials upon application of the gauge to a surface of the material. An indicator moves over a dial face in accordance with the differential movement of a unit travelling over the face of the material and cutters which penetrate the coating material to the base to which it is applied. Provision is made for applying the gauge manually, or for mounting it adjacent to rolls for application to plastic material on the roll surfaces.

The accompanying drawings illustrate a present preferred embodiment of the invention in which Figure 1 is a face view partially in elevation and partially in section of a gauge embodying my invention;

Figure 2:
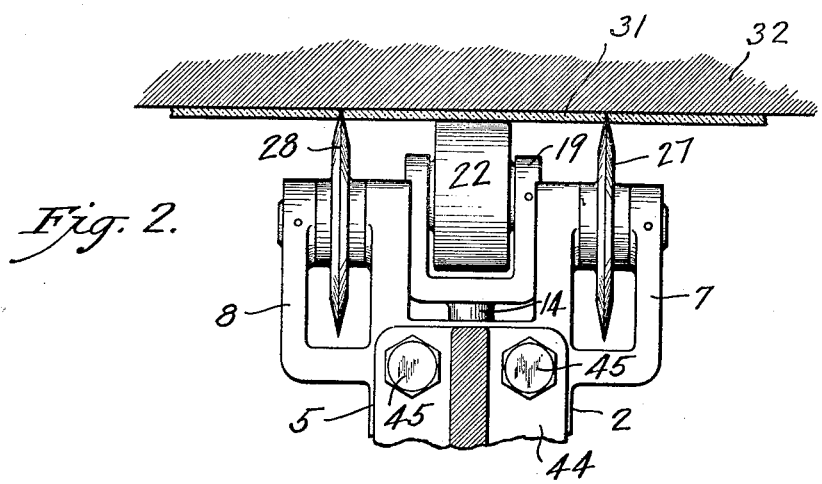
Fig. 2 is a detail view of a portion of the gauge showing the actuating mechanism applied to a sheet of material whose thickness is being measured.
Figure 3:
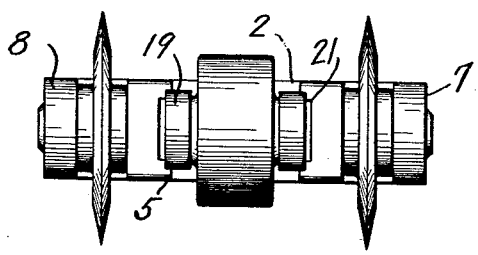
Fig. 3 is an end view of the actuating mechanism of the gauge.

Referring particularly to Figs. 1 to 3, a gauge 1 for measuring the thickness of plastic materials comprises a frame 2 having a hollowed portion 3 shaped to receive an indicating device 4 and a tubular base portion 5 terminating in an opening 6, which is flanked by bifurcated arms 7 and 8. The other end of the frame 2 is provided with an opening 8 for the reception of a tube 9 constituting a portion of a handle.

The indicating device 4 comprises a circular body which is inserted in the portion 3 of the frame 2. Screws 10 may extend through the frame 2 for securing the indicating device. A pointer 11 moves about a pivot 12 over indices 13 carried on the face of the indicator. One form of the indices 13 is a series of lines extending around the periphery of the face of the indicating device 4. In the drawings the face of the indicating device 4 has been divided into one hundred parts and numbered from zero to ninety-nine, although it is to be understood that other notations may be applied to the face, if desired. The pointer 11 is actuated by a mechanism within the indicating device 4 in response to movement of a plunger 14 extending downwardly into the tubular base portion 5 of the frame 2. The end of the plunger 14 is provided with threads 15 for receiving a threaded sleeve 16. The other end of the sleeve 16 is provided with threads 17 for the reception of a threaded shank 18 which supports a yoke 19. A lock nut 20 is provided on the shank 18 for locking the shank against rotation relative to the sleeve 16.

The yoke 19 is movable longitudinally of the tubular portion 5 of the frame 2 in a track 21. The track 21 prevents rotation of the yoke 19 which carries a roller 22 for engaging and riding over the surface of the plastic material being measured. The roller 22 is mounted to turn about a pin 24. The pin 24 is secured in the yoke 19 by a small pin or rivet 25 projecting into and carried by one of the arms of the yoke.

For adjusting the normal position of the surface of the roller 22 relative to the zero or other readings of the pointer 11, the sleeve 16 is provided with a series of openings 26 for the reception of a turning tool. By providing the threads 15 on the plunger 14 of a different pitch than the threads 17 on the shank 18, a very close adjustment of the position of the roller 22 can be obtained by turning the sleeve 16 upon the loosening of the lock nut 20. The normal position of the outer surface of the roller 22 should be in line with the edges of cutters 27 and 28 mounted in the arms 7 and 8, respectively. The cutters 27 and 28 are illustrated in the form of tapered discs, although it is to be understood that other types of plastic material penetrating instruments may be substituted for the discs, if desired. The cutters 27 and 28 are turned about pins 29 extending through the bifurcations of the arms 7 and 8. Anchoring pins 30 may be provided for securing the pins 29 in place. In the inoperative position of the gauge, the outer edges of the cutters 27 and 28 are in alignment with a line extending axially along the outer face of the roll 22. Any movement of the roll 22 out of its normal position is indicated by a movement of the pointer.

As shown in Fig. 2, the roller 22 normally engages the outer surface of a sheet of plastic material 31, while the cutters 27 and 28 penetrate the material until they engage a base material 32 which may be a roll surface or some material other than the coating layer or sheet. Such a movement of the roller 22 out of its normal position causes the plunger 14 to move inwardly of the indicating device 4 with a corresponding movement of the pointer 11.

As shown in Figs. 1 and 2, the plunger 14 and the sleeve 16 are in alignment with that component, which causes the relative motion between the roller 22 and the cutters 27 and 28, of the forces acting on the roller 22 when the gauge is in operative position adjacent the base material 32.

For manually handling the gauge, a handle 34 is secured to the tube 9 by a pin 35. The pin 35 is given a tight fit in openings 36 in the tube 9 and extends into slots 37 in the handle 34 so that the handle 34 has longitudinal movement relative to the tube 9. The longitudinal movement of the handle 34 is resisted by a coil spring 38 bearing against the pin 35 and a seat 39 in the handle 34. By providing a yielding telescopic movement of the handle 34 the pressure applied to the cutters 27 and 28 is maintained substantially constant within the limits of the yielding movement of the handle 34. This is important where the gauge is used to determine the thickness of a coating layer on calendar rolls, or the like, as the pressure applied to the cutters 27 and 28 through the compression of the spring 38 is sufficient to cause the cutters to penetrate the coating material but not to score or cut the roll surface therebeneath. The incision made in the plastic coating material by the cutters 27 and 28 may be closed by the working of the material 31 in rolls or other devices. An opening made in an uncured rubber coating is very easily closed due to the tenacious adhering qualities of the material itself, which possesses an affinity like characteristic toward materials of like nature.

Figure 4:
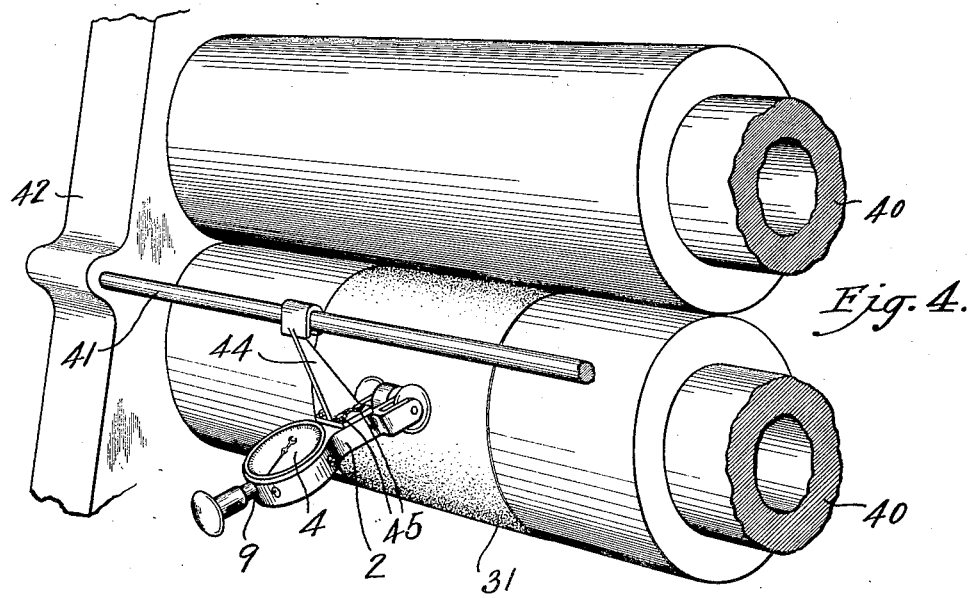
Fig. 4 is a perspective view of a pair of calender rolls with a gauge mounted on the frame in co-operating relation to one of the rolls.

Referring to Fig. 4, the gauge may be mounted in co-operative relation to one of a pair of calender rolls 40 by providing a shaft 41 in the frame 42 supporting the rolls 40. An arm or bracket 44 is hooked, or otherwise secured to the shaft 41 and is attached to the frame 2 by screws 45, or the like, so that the gauge normally hangs from the shaft 41 with the cutters 27 and 28 and roller 22 in contact with material 31 on the rolls 40. Preferably, the position of the shaft 41 and the length and shape of the arm 44 is such that the engaging areas of the cutters 27 and 28 and the roller 22 are tangential to the surface of the calendar roll. This insures accuracy of measurement by presenting the gauging roller 22 to the material being gauged in a right angle relation. As the gauge is slidable along the shaft 21, the thickness of the material at different points along the rolls may be gauged. The gauge may be applied intermittently or at durations consistent with the desired stock uniformity, by the application of pressure to the handle 34.

As shown by Fig. 4, the bracket is suspended from the shaft 41 in such a manner that the gauge is permitted to rotate about the shaft 41. Thus the shaft acts as an axis parallel either to the working face of the material or to the axle of the working roll. Moreover, the rotation of the gauge about such an axis permits the material engaging parts of the gauge such as the rollers and penetrating discs to move in an arcuate path about the shaft 41 as a center and with the bracket arm 44 and frame connections as a radius. However, for the short distance which the gauge is required to be moved from operative to inoperative position, this movement in the arcuate path may be regarded either as a limited movement substantially perpendicular to the surface of the penetrated material or as a limited movement radially of the roll.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A device for use upon a machine having a working roll and a rod adjacent and substantially parallel to the working face of said roll, comprising a bracket carried by and slidable along the rod, said bracket having pivotal movement about said rod as an axis, a gauge carried by said bracket, said gauge including means for engaging material on said roll, means for penetrating said material, said penetrating means being relatively bodily movable with respect to said material engaging means and an indicator responsive to such relative movement, and a yieldably mounted handle on said gauge for applying a safe and uniform pressure between said roll and said penetrating means.

2. A device for measuring the thickness of material comprising means for engaging the surface of the material being measured, relatively bodily movable means for penetrating the material, an indicator operable in accordance with the relative movement between said engaging and penetrating means, and a yieldably mounted handle for applying pressure to said device whereby the penetrating pressure exerted by said penetrating means is controlled.

3. A device for measuring the thickness of material comprising a frame, means mounted on said frame for penetrating material to be measured, relatively bodily movable means carried by said frame for engaging a surface of the material to be measured, an indicator operable in accordance with the relative movement of said penetrating and engaging means, and a yieldably mounted handle for applying pressure to said frame, the mounting for said handle serving to control the pressure exerted by said penetrating means in entering the material being measured.

ADRIAN O. ABBOTT, Jr.